United States Patent
Lu et al.

(10) Patent No.: US 12,217,909 B2
(45) Date of Patent: Feb. 4, 2025

(54) SOFT BISTABLE MAGNETIC ACTUATOR AND FABRICATION METHOD THEREOF, FATIGUE TESTING DEVICE AND AUTO UNDERWATER VEHICLE

(71) Applicant: City University of Hong Kong Matter Science Research Institute (Futian), Shenzhen (CN)

(72) Inventors: Jian Lu, Shenzhen (CN); Zhou Chen, Shenzhen (CN); Lei Wan, Shenzhen (CN); Yunhu He, Shenzhen (CN)

(73) Assignee: City University of Hong Kong Matter Science Research Institute (Futian), Shenzhen (CN)

( * ) Notice: Subject to any disclaimer, the term of this patent is extended or adjusted under 35 U.S.C. 154(b) by 244 days.

(21) Appl. No.: 17/700,831

(22) Filed: Mar. 22, 2022

(65) Prior Publication Data
US 2023/0131840 A1    Apr. 27, 2023

Related U.S. Application Data

(63) Continuation of application No. PCT/CN2021/128207, filed on Nov. 2, 2021.

(30) Foreign Application Priority Data

Oct. 27, 2021    (CN) .......................... 202111260482.0

(51) Int. Cl.
*C08K 3/38*    (2006.01)
*B29C 45/00*    (2006.01)
(Continued)

(52) U.S. Cl.
CPC .......... *H01F 7/204* (2013.01); *B29C 45/006* (2013.01); *B29C 45/1615* (2013.01);
(Continued)

(58) Field of Classification Search
CPC .......... B29C 45/006; B29C 2045/1601; B29C 45/1615; B29C 45/164; B29C 2045/169;
(Continued)

(56) References Cited

U.S. PATENT DOCUMENTS

| 4,141,941 A | 2/1979 | Travnicek |
| 2016/0329838 A1 | 11/2016 | Li et al. |

(Continued)

FOREIGN PATENT DOCUMENTS

| CN | 108676111 A | 10/2018 |
| CN | 110722545 A | 1/2020 |

(Continued)

OTHER PUBLICATIONS

First Office Action issued in counterpart Chinese Patent Application No. 202111260482.0, dated Jun. 28, 2022.
(Continued)

*Primary Examiner* — Leo B Tentoni
(74) *Attorney, Agent, or Firm* — Westbridge IP LLC

(57) ABSTRACT

Disclosed are a soft bistable magnetic actuator, a fabrication method thereof, a fatigue testing device, and an auto underwater vehicle. The method for fabricating the soft bistable magnetic actuator includes the following operations: casting a soft precursor by injection molding, wherein the soft precursor consists of a soft deformable portion and a soft peripheral portion surrounded, the soft deformable portion is made of magnetic particles and polymer, and the soft peripheral portion is made of a magnetic particle, a mixture of organic liquid, and polymer; and extracting the organic liquid by an organic solvent shrinks the soft peripheral portion, buckles the soft deformable portion towards one side.

5 Claims, 5 Drawing Sheets casting a soft precursor by injection molding, wherein the soft precursor consists of a soft deformable portion and a soft peripheral portion surrounded, the soft deformable portion is made of magnetic particles and polymer, and the soft peripheral portion is made of magnetic particles, a mixture of organic liquid and polymer extracting the organic liquid by an organic solvent to shrink the soft peripheral portion, and to buckle the soft deformable portion towards one side (51) Int. Cl.
  *B29C 45/16* (2006.01)
  *C08L 83/00* (2006.01)
  *C08L 83/04* (2006.01)
  *H01F 1/053* (2006.01)
  *H01F 1/113* (2006.01)
  *H01F 1/117* (2006.01)
  *H01F 1/34* (2006.01)
  *H01F 7/20* (2006.01)
  *H01F 41/02* (2006.01)
  *H01H 55/00* (2006.01)
  *B29C 71/00* (2006.01)
  *B29K 83/00* (2006.01)
  *B29K 505/02* (2006.01)
  *B29K 505/08* (2006.01)
  *B29K 505/12* (2006.01)
  *C08K 3/22* (2006.01)

(52) U.S. Cl.
  CPC ......... *B29C 45/164* (2013.01); *H01F 1/0533* (2013.01); *H01F 41/0266* (2013.01); *H01H 55/00* (2013.01); *B29C 2045/1601* (2013.01); *B29C 2045/169* (2013.01); *B29C 2071/0027* (2013.01); *B29K 2083/00* (2013.01); *B29K 2505/02* (2013.01); *B29K 2505/08* (2013.01); *B29K 2505/12* (2013.01); *B29K 2995/0008* (2013.01); *C08K 2003/2265* (2013.01)

(58) Field of Classification Search
  CPC ........ B29C 2071/0027; B29K 2083/00; B29K 2505/02; B29K 2505/08; B29K 2505/12; B29K 2995/0008; C08K 2003/2265; C08K 3/38; C08L 83/00; C08L 83/04; H01F 1/0533; H01F 1/113; H01F 1/117; H01F 1/34; H01F 2007/1669
  USPC ........... 264/250, 255, 331.11, 344, 427, 429, 264/437, 478; 252/62.53, 62.54, 62.56, 252/62.57, 62.58, 62.6; 524/588, 701, 524/779, 780
  See application file for complete search history.

(56) References Cited

U.S. PATENT DOCUMENTS

2017/0005557 A1  1/2017  Wieters
2017/0006382 A1  1/2017  Luzzato et al.

FOREIGN PATENT DOCUMENTS

| CN | 111306324 A |   | 6/2020  |           |
|----|-------------|---|---------|-----------|
| CN | 111416546 A |   | 7/2020  |           |
| CN | 111531528 A |   | 8/2020  |           |
| CN | 112158319 A |   | 1/2021  |           |
| CN | 112318488 A |   | 2/2021  |           |
| CN | 113008710 A |   | 6/2021  |           |
| CN | 113114066 A |   | 7/2021  |           |
| CN | 113232812 A |   | 8/2021  |           |
| JP | H08160752 A |   | 6/1996  |           |
| JP | 2001162652 A |   | 6/2001  |           |
| JP | 2001246641 A | * | 9/2001 | ......... B29C 45/1615 |
| JP | 2019080418 A |   | 5/2019  |           |

OTHER PUBLICATIONS

International Search Report and Written Opinion issued in corresponding PCT Application No. PCT/CN2021/128207, dated Jul. 28, 2022.

* cited by examiner

S10 — casting a soft precursor by injection molding, wherein the soft precursor consists of a soft deformable portion and a soft peripheral portion surrounded, the soft deformable portion is made of magnetic particles and polymer, and the soft peripheral portion is made of magnetic particles, a mixture of organic liquid and polymer S20 — extracting the organic liquid by an organic solvent to shrink the soft peripheral portion, and to buckle the soft deformable portion towards one side

SOFT BISTABLE MAGNETIC ACTUATOR AND FABRICATION METHOD THEREOF, FATIGUE TESTING DEVICE AND AUTO UNDERWATER VEHICLE

CROSS-REFERENCE TO RELATED APPLICATIONS

This application is a continuation application of International Application No. PCT/CN2021/128207, filed on Nov. 2, 2021, which claims priority to Chinese Patent Application No. 202111260482.0, filed on Oct. 27, 2021. The disclosures of the above-mentioned applications are incorporated herein by reference in their entireties.

TECHNICAL FIELD

The present disclosure relates to the technical field of soft actuators, and in particular to a soft bistable magnetic actuator, a fabrication method thereof, a fatigue testing device, and an auto underwater vehicle.

BACKGROUND

A bistable structure refers to a special structure that can transfer the configuration between two stable equilibrium states under the external stimulus. The bistable soft actuator can transfer between two configurations with the action of electric, heat, light, hydration, magnetic field, and so on.

As will be appreciated, bistable soft actuators have been widely used as an energy-absorbing device, smart switch, microlens surface, etc.

The soft bistable magnetic actuator, fabricated by soft polymer and magnetic materials, exhibits remarkable morphing behavior, i.e., fast configuration transition reacting to light external magnetic field. The configuration and snapping behavior can be tuned through the predesign of the soft polymer and the reorientation of the magnetic particles.

The soft bistable magnetic actuator may find application in several fields including robotics, biology, and electronics.

It is against this background that the present disclosure has developed.

SUMMARY

The main objective of the present disclosure is to provide a soft bistable magnetic actuator, a fabrication method thereof, a fatigue testing device, and an auto underwater vehicle, which aims to settle the problem that the method of fabricating the soft bistable magnetic actuator is complicated and the deflection of the actuator cannot be adjusted, and simultaneously aims to realize the intelligent driving.

To achieve the above objectives, the present disclosure provides a method for fabricating a soft bistable magnetic actuator, including the following operations:

casting a soft precursor by injection molding, wherein the soft precursor includes a soft deformable portion and a soft peripheral portion surrounded, the soft deformable portion is made of magnetic particles and polymer, and the soft peripheral portion is made of magnetic particles, a mixture of organic liquid and polymer; and extracting the organic liquid by an organic solvent to shrink the soft peripheral portion, and to buckle the soft deformable portion towards one side.

In an embodiment, the operation of casting the soft precursor by injection molding includes:

leveraging a first injection mold with a first cavity;

placing the first material, a mixture of magnetic particles and polymer, under a molten state in the first cavity to cast the soft deformable portion;

leveraging a second injection mold with a second cavity;

placing the soft deformable portion in the second cavity to form a groove around the soft deformable portion; and placing the second material, a mixture of magnetic particles, organic liquid, and polymer, under a molten state in the groove to cast the soft peripheral portion.

In an embodiment, both the first cavity and the second cavity are designed as circular grooves, and the depth of the first cavity equals that of the second cavity;

the operation of leveraging the first injection mold with the first cavity includes:

selecting the first injection mold with different cavity depths to control the buckling deflection of the soft deformable portion;

the operation of leveraging the second injection mold with the second cavity:

selecting the first injection mold with different cavity diameters and the second injection mold with different cavity diameters to control the buckling deflection of the soft deformable portion.

In an embodiment, the operation of casting a soft precursor by injection molding includes:

before curing the soft deformable portion, positioning the soft deformable portion in a magnetic field to arrange the magnetic particles in the soft deformable portion along a magnetic induction line; and before curing the soft peripheral portion, positioning the soft peripheral portion in the magnetic field to arrange the magnetic particles in the soft peripheral portion along the magnetic induction line.

In an embodiment, the magnetic particle includes at least one of rubidium iron boron magnetic powder, alnico magnetic powder, hard ferrite magnetic powder, samarium cobalt magnetic powder, and other magnetic powders; and/or the polymer includes at least one of siloxane, polysilsesquioxane, polycarbosiloxane, polysilyl carbodiimide, polysilsesquioxane, polysilazane, and polysilsesquiazane; and/or the organic liquid includes silicone oil.

The present disclosure provides a soft bistable magnetic actuator, including:

a soft precursor, including a soft deformable portion and a soft peripheral portion, surrounded;

wherein the soft deformable portion buckles towards one side.

In an embodiment, the soft precursor is a circular sheet.

In an embodiment, the soft bistable magnetic actuator further includes a soft constraint to fix the soft precursor in a preset position, when the direction of the magnetic field applied to the soft bistable magnetic actuator is switched, the soft precursor transfers from concave configuration to convex configuration.

In an embodiment, the soft constraint is a soft annular sheet, and the inner ring of the soft annular sheet is bonded to the soft precursor partially or circumferentially.

The present disclosure further provides a fatigue testing device, including the soft bistable magnetic actuator as described above; and a flexible electronic device, the ends of the flexible electronic device are bonded to the soft precursor under an original state, when the direction of the magnetic field applied to the soft precursor is switched, the flexible electronic device transits between the folded state and the original state, and the ends of the flexible electronic device are folded towards the middle of the flexible electronic device.

The present disclosure further provides an auto underwater vehicle, including the soft bistable magnetic actuator as described above; and a magnetic field generating device, the soft bistable magnetic actuator is placed in a magnetic field generated by the magnetic field generating device, and when the direction of the magnetic field generated by the electromagnet is switched, the soft precursor is switched from concave configuration towards convex configuration.

In technical solutions of the present disclosure, the soft precursor includes a soft deformable portion and a soft peripheral portion surrounded, the soft deformable portion is made of magnetic particles and polymer, and the soft peripheral portion is made of magnetic particles and the mixture of organic liquid and polymer. The soft precursor is cast through injection molding, and extracting the organic liquid by an organic solvent shrinks the soft peripheral portion, and bends the soft deformable portion towards one side. As a result, it is a technical route to form a stable state with the minimum potential energy, and the fabrication process is simple. It is possible to obtain the soft precursor with different buckling deflection through adjusting the size of the soft deformation portion and the soft peripheral portion, that is, adjusting the deflection of the soft precursor easily and saving the fabrication cost.

BRIEF DESCRIPTION OF THE DRAWINGS

To illustrate the embodiments of the present disclosure clearly, drawings of the embodiments will be briefly described below. The drawings in the following description are only some embodiments of the present disclosure. It will be apparent for those skilled in the art that other figures can be obtained according to the structures shown in the drawings without creative work.

The realization of the objective, functional characteristics and advantages of the present disclosure are further described concerning the accompanying drawings.

DETAILED DESCRIPTION OF THE EMBODIMENTS

The technical solutions of the embodiments of the present disclosure will be described in more detail below concerning the accompanying drawings. The embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indicator is only used to explain the relative positional relationship, movement, etc. of the components in a certain posture (as shown in the drawings). If the specific posture changes, the directional indication will change accordingly.

In addition, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. Besides, the meaning of "and/or" appearing in the disclosure includes three parallel scenarios. For example, "A and/or B" includes only A, or only B, or both A and B. The technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

Soft actuators refer to smart materials or structures that can deform under the stimulation of light, pressure, heat, magnetic field, electricity, and liquid. Soft actuators have a wide range of applications in fields such as artificial muscles, grippers, and bionic fish.

The bistable structure is a special mechanical structure, which has two stable states with minimum potential energy. Under external excitation, the bistable structure can snap-through and snap-back between two stable states.

The bistable dome structure is made of silicon rubber by the casing method. The silicon rubber replicates the shape of the dome mold and has two stable configurations. The magnetic particles are embedded into the silicon rubber so that the bistable dome structure can be attracted by the permanent magnet. The bistable dome structure can snap-through from one stable-state to another stable state and snap-back to the original stable state. However, the dome structure is fabricated by casting, which is complicated. The deflection of the dome is not adjustable.

Therefore, the present disclosure provides a soft bistable magnetic actuator that can transform the configuration between two stable states under the application of the direction changeable magnetic field. The actuator structure is simple, easy to fabricate, low cost, and responsive.

Figure 5:
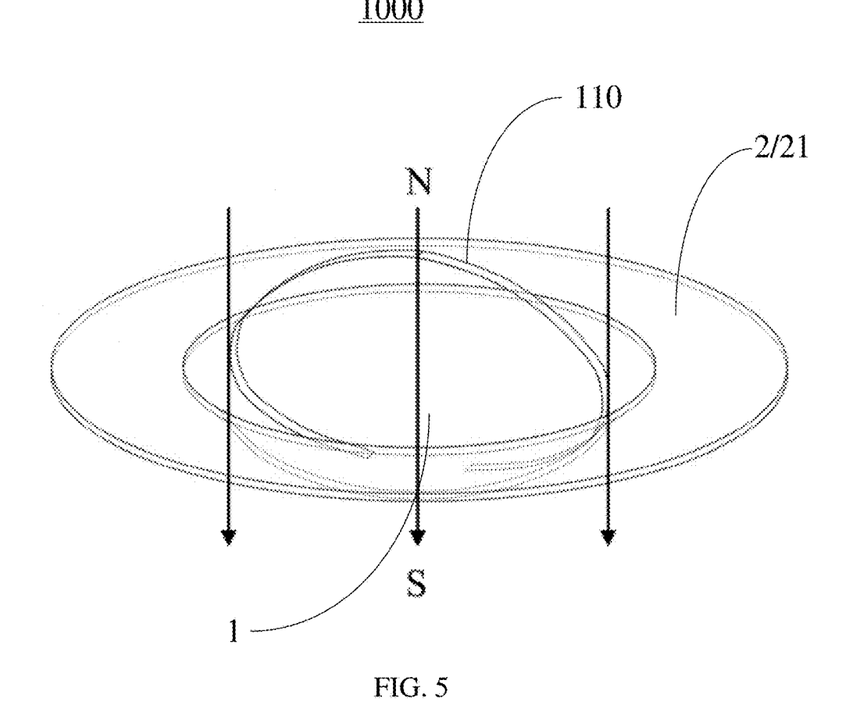
FIG. 5 is a structure schematic diagram of a fatigue testing device according to an embodiment of the present disclosure.
Figure 6:
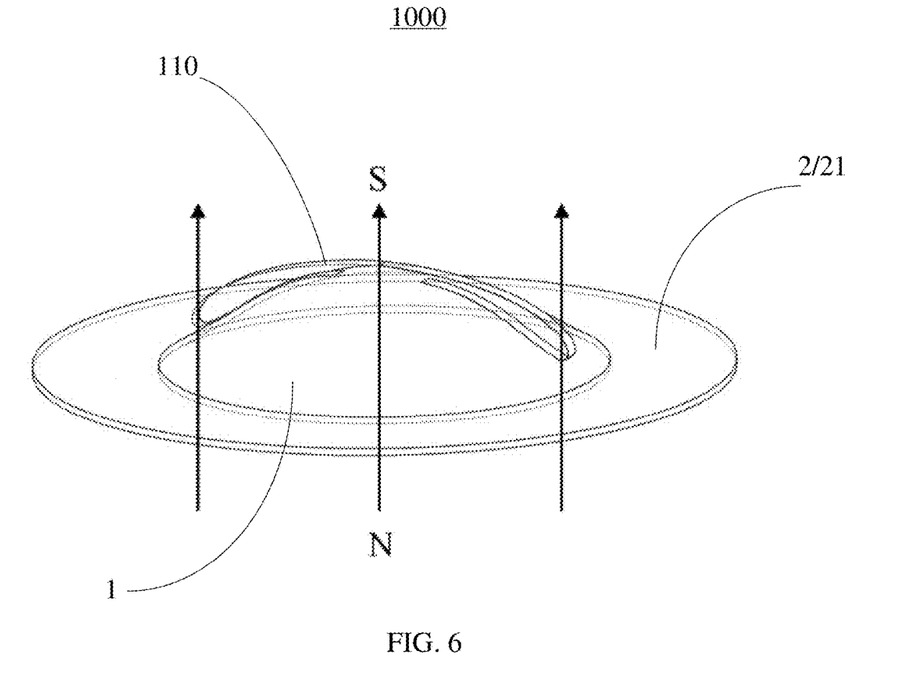
FIG. 6 is a structure schematic diagram of a fatigue testing device under the other stable state with the flexible circuit being folded.
Figure 7:
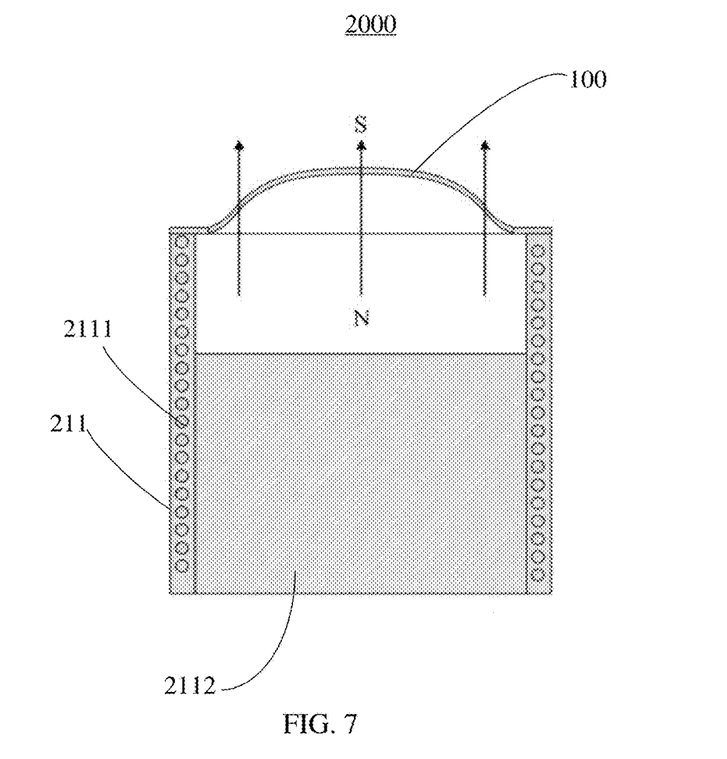
FIG. 7 is a structure schematic diagram of an auto underwater vehicle according to an embodiment of the present disclosure.

FIG. 1 to FIG. 4 show a soft bistable magnetic actuator according to an embodiment of the present disclosure. FIG. 5 and FIG. 6 show a fatigue testing device according to an embodiment of the present disclosure. FIG. 7 shows an auto underwater vehicle according to an embodiment of the present disclosure.

Figure 1:
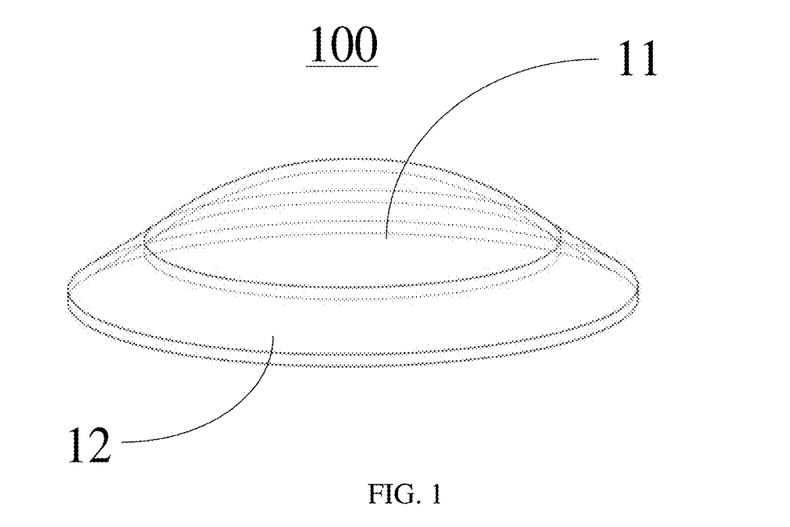
FIG. 1 is a structure schematic diagram of a soft bistable magnetic actuator according to an embodiment of the present disclosure.
Figure 2:
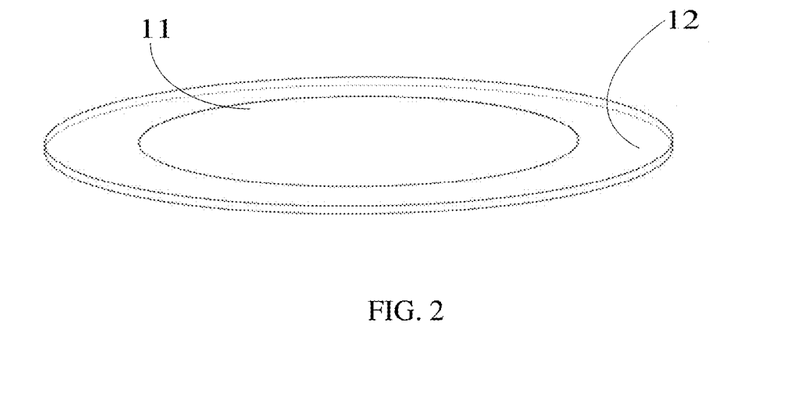
FIG. 2 is a structure schematic diagram of soft precursor, shown as FIG. 1, without extraction.

As shown in FIG. 1 and FIG. 2, a soft bistable magnetic actuator 100 includes a soft precursor 1. The soft precursor 1 contains a soft deformable portion 11 and a soft peripheral portion 12 surrounded. The soft deformable portion 11 buckles upwards or downwards.

In technical solutions of the present disclosure, the soft precursor 1 includes a soft deformable portion 11 and a soft peripheral portion 12 surrounded, the soft deformable portion 11 is made of magnetic particles and polymer, and the soft peripheral portion 12 is made of magnetic particles, a mixture of organic liquid and polymer. The soft precursor 1 is fabricated by injection molding, and the organic liquid is extracted by an organic solvent to shrink the soft peripheral portion 12, to buckle the soft deformable portion 11 towards one side. As a result, it is possible to keep a stable state with the minimum potential energy, and the fabrication process is simple. The buckling deflection of the soft deformable portion 11 is adjustable through adjusting the size of the soft deformable portion 11 and the soft peripheral portion 12 during the fabrication process, that is, adjusting the deflection of the soft precursor 1 and saving the preparation cost.

In the present disclosure, the shape of the soft precursor 1 is not limited. To make the soft bistable magnetic actuator 100 responsive and simplify the fabrication of the soft precursor 1, in this embodiment, as shown in FIG. 1 and FIG. 2, the soft precursor 1 is a circular sheet. The soft precursor 1 is set as a circular shape. On one hand, during the fabrication process, due to the circumferential shrinkage of the soft peripheral portion 12, the soft deformable portion 11 can buckle towards one side asymmetrically. On the other hand, when changing the direction of the magnetic field acting on the soft bistable magnetic actuator 100, the soft deformable portion 11 can be converted from concave configuration towards convex configuration quickly. With this design, the fabrication method is simpler and the snapping performance is better.

In this embodiment, the soft precursor 1 is buckled towards one side, and the states with the minimum potential energy are set as stable states. To transfer the configuration of the soft precursor 1 between two stable states more efficiently, leading to the quick snapping behavior of the soft bistable magnetic actuator 100, the soft bistable magnetic actuator 100 further equipped with a soft constraint 2. The soft constraint 2 is introduced to fix the soft precursor 1 at a preset position. Switching the direction of the magnetic field that applied to the soft precursor 1 to transfer the soft deformable portion 11 from concave configuration towards convex configuration. That is, the soft precursor 1 can transmit from one stable state to the other stable state under the action of the magnetic field. The snapping behavior of the soft deformable portion 11 ensures the basic performance of the soft bistable magnetic actuator 100. Because of the stretchability of the soft constraint 2, the soft bistable magnetic actuator 100 can be applied to the field of soft robots more flexibly.

Figure 3:
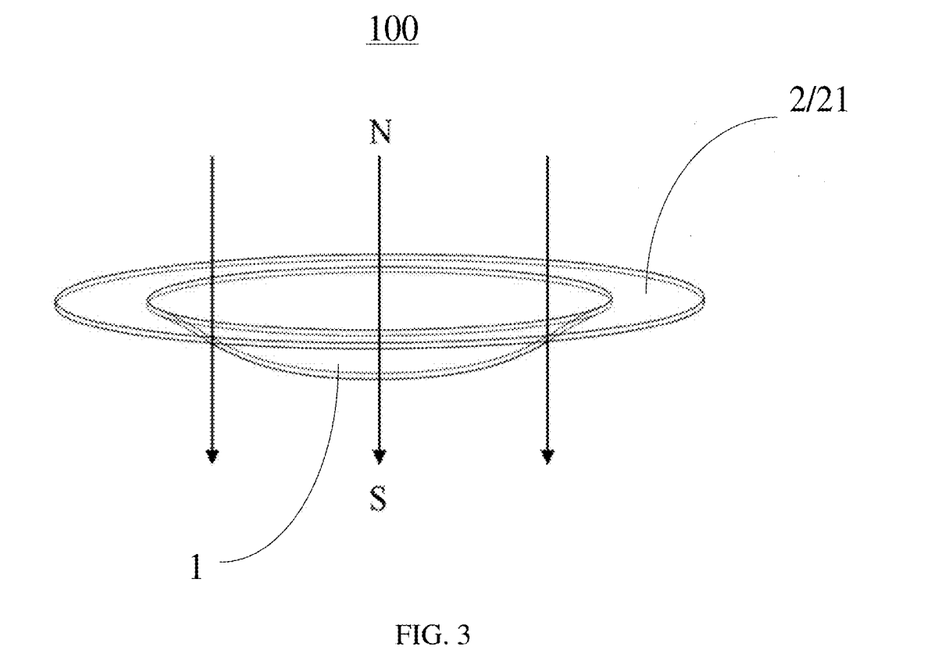
FIG. 3 is a structure schematic diagram of a soft precursor, shown as FIG. 1, circumferentially fixed by a soft constraint, and the soft precursor is in one stable state.
Figure 4:
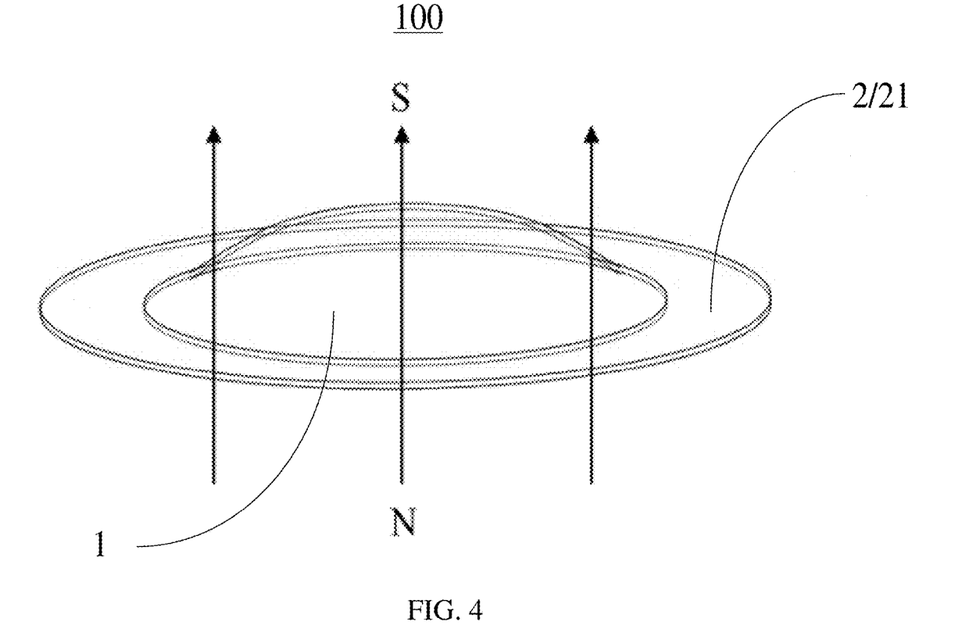
FIG. 4 is a structure schematic diagram of the soft precursor, indicated in FIG. 3, which is in the other stable state.

Specifically, in this embodiment, as shown in FIG. 3 and FIG. 4, the soft constraint 2 is an annular sheet 21. The inner ring of the soft annular ring 21 is bonded to the soft precursor 1. The periphery of the soft precursor 1 is bonded to the soft annular ring 21 partially or totally. Therefore, the soft precursor 1 is fixed by the soft annular ring 21.

The present disclosure does not limit the bonding form of the soft precursor 1 and the soft annular ring 21, as long as the soft precursor 1 can be transferred from one stable state to the other stable state but attracted to the magnet polar.

In addition, the present disclosure does not limit the shape of the soft annular ring 21, which can be changed by the user to adapt to other structures when the soft bistable magnetic actuator 100 is installed on the structure. The inner ring of the soft annular ring 21 is adapted for the soft precursor 1. In other embodiments, the outer ring of the soft annular ring 21 can be square or polygon.

In other embodiments, the soft constraint 2 can also be a soft fixing pillar, and one end of the soft fixing pillar is bonded to the middle of the soft precursor 1, thereby fixing the soft precursor 1. If the soft precursor 1 bends upwards, the soft precursor 1 has a convex surface that bends outwards and a concave surface that bends inwards, vice versa. One end of the soft fixing pillar is glued to the convex surface or the concave surface. The soft precursor 1 transfers to the other configuration (convex surface transfer to concave surface, or concave surface transfer to convex surface), when the direction of the magnetic field applied to the soft precursor 1 is changed. Thus, the original convex surface connected to the soft fixing pillar converts into the concave surface through bending downwards. On the other hand, the concave surface connected to the soft fixing pillar converts into the convex surface through bending upwards. As a result, it is possible to constrain the soft precursor centrally and extend the usage diversity.

As shown in FIG. 5 and FIG. 6, the present disclosure provides a fatigue testing device 1000. The fatigue testing device 1000 includes the soft bistable magnetic actuator 100 described above and a flexible electronic device. The ends of the flexible electronic device are all bonded to the soft precursor 1 to form an original state of the flexible electronic device. When the soft precursor 1 is in the magnetic field and the direction of the magnetic field is switched, the flexible electronic device can transmit between a folded state and the original state, and the end of the flexible electronic device is folded towards the center of the flexible electronic device in the folded state. Thus, the flexible electronic device can be folded and unfolded to perform a crease fatigue test.

In an embodiment, the flexible electronic device contains a flexible circuit 110. Meanwhile, the soft bistable magnetic actuator 100 is fixed by the soft annular ring 21 and is in a stable state, i.e., the soft precursor 1 is buckled downwards. Both ends of the flexible circuit 110 are bonded to the concave surface of the soft precursor 1. A direction-reversible magnetic field is applied to the soft bistable magnetic actuator 100 to switch the configuration of soft precursor 1, i.e., the concave surface of the soft precursor 1 buckles upwards until it obtains another stable state. At the same time, both ends of the flexible circuit 110 are folded towards the center of the flexible circuit 110, i.e., transferring from the original state to the folded state. After switching back the direction of the magnetic field, the convex surface is converted to the concave surface, the flexible circuit 110 is transferred from the folded state back to the original state, and so on. The crease fatigue testing of the flexible circuit 110 is performed in this way. With this arrangement, the testing device is simple, easy to control, and the cost is low.

In another embodiment, the flexible electronic device includes a six-arm flexible circuit 110. The six-arm flexible circuit 110 contains six arms, and these arms are connected in the center. The ends of the six flexible circuits 110 are connected to the concave surface of the soft precursor 1. Changing the direction of the magnetic field, which is applied to the soft bistable magnetic actuator 100 leads to the configuration transition of soft precursor 1, i.e., from one stable state to another stable state. The concave surface of the soft precursor 1 bends upwards until the surface became the convex one. Meanwhile, the ends of the six flexible circuits 110 are all folded towards the center of the flexible circuit 110, i.e., switching from the original state to the folded state. By switching back the direction of the magnetic field, the convex surface can be converted back to the concave surface automatically, the flexible circuit 110 is transferred from the folded state back to the original state, and so on. In this manner, the crease fatigue testing of the flexible circuit 110 is performed. With this arrangement, the test device is simple, easy to control, and the test cost is low.

The present disclosure provides an auto underwater vehicle 2000, including a magnetic field generating device and a soft bistable magnetic actuator 100. The soft precursor 1 in the soft bistable magnetic actuator 100 is placed in a magnetic field generated by the magnetic field generating device. When the direction of the magnetic field generated by the magnetic field generating device is switched, the soft precursor 1 buckles from one side towards the other side.

Specifically, as shown in FIG. 7, the auto underwater vehicle 2000 works underwater. The magnetic field generating device includes an electromagnet 211. The electromagnet 211 consists of an iron core 2112 and a copper coil 2111 surrounded. The soft bistable magnetic actuator 100 is installed on the top of the electromagnet 211, and the copper coil 2111 is energized to generate a magnetic field. By changing the direction of the current in the copper coil 2111 switches the direction of the magnetic field, the soft precursor 1 can transfer the configuration between two stable states, i.e., the soft precursor 1 bends upwards from the iron core 2112 and bends downwards to the iron core 2112. Therefore the buoyancy of the auto underwater vehicle 2000 can be increased or decreased, and the auto underwater vehicle 2000 can float on the water or sink under the water. The device is low-cost and is easy to control.

Figure 8:
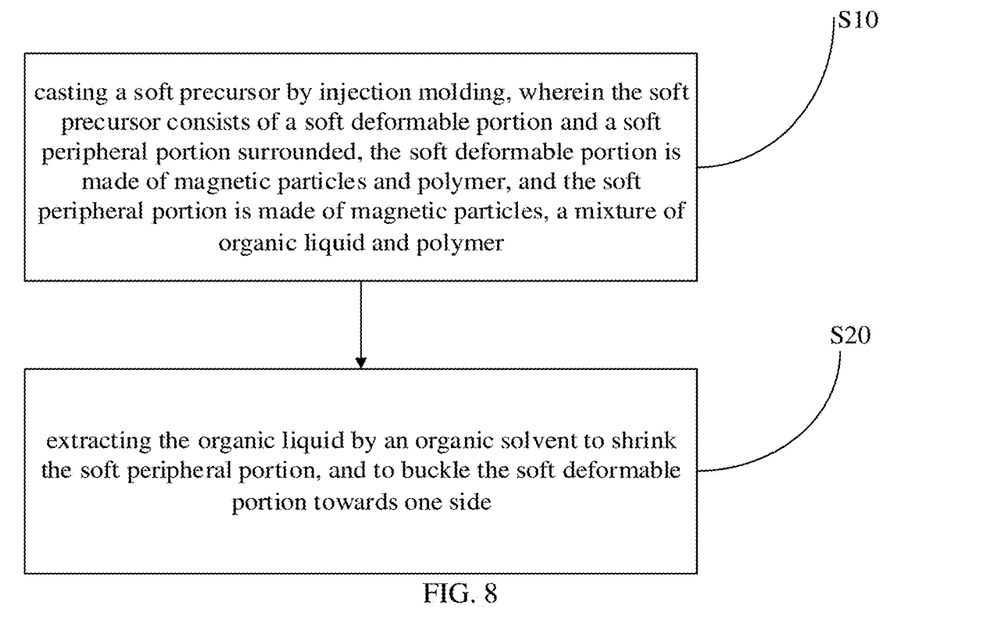
FIG. 8 is a flow chart of the method for fabricating a soft bistable magnetic actuator according to an embodiment of the present disclosure.

Based on the design of the soft bistable magnetic actuator 100 described above, the present disclosure also provides a method for fabricating the soft bistable magnetic actuator 100. FIG. 8 shows the flow chart of a method for fabricating the soft bistable magnetic actuator 100 according to an embodiment of the present disclosure.

Operation S10, casting a soft precursor 1 by injection molding. The soft precursor 1 consists of a soft deformable portion 11 and a soft peripheral portion 12 surrounded, the soft deformable portion 11 is made of magnetic particles and polymer, and the soft peripheral portion 12 is made of magnetic particles, a mixture of organic liquid and polymer.

Operation S20, extracting the organic liquid by an organic solvent to shrink the soft peripheral portion 12, and to buckle the soft deformable portion towards one side.

In this embodiment, the soft deformable portion 11 is made of magnetic particles and polymer, and the soft peripheral portion 12 is made of magnetic particles, a mixture of organic liquid and polymer. The soft precursor 1 is immersed in the organic solvent, and the organic liquid is extracted by the organic solution. The soft peripheral portion 12 shrinks so that the soft deformable portion 11 bends towards one side; in this method, the fabrication is easy and the cost is low.

Figure 9:
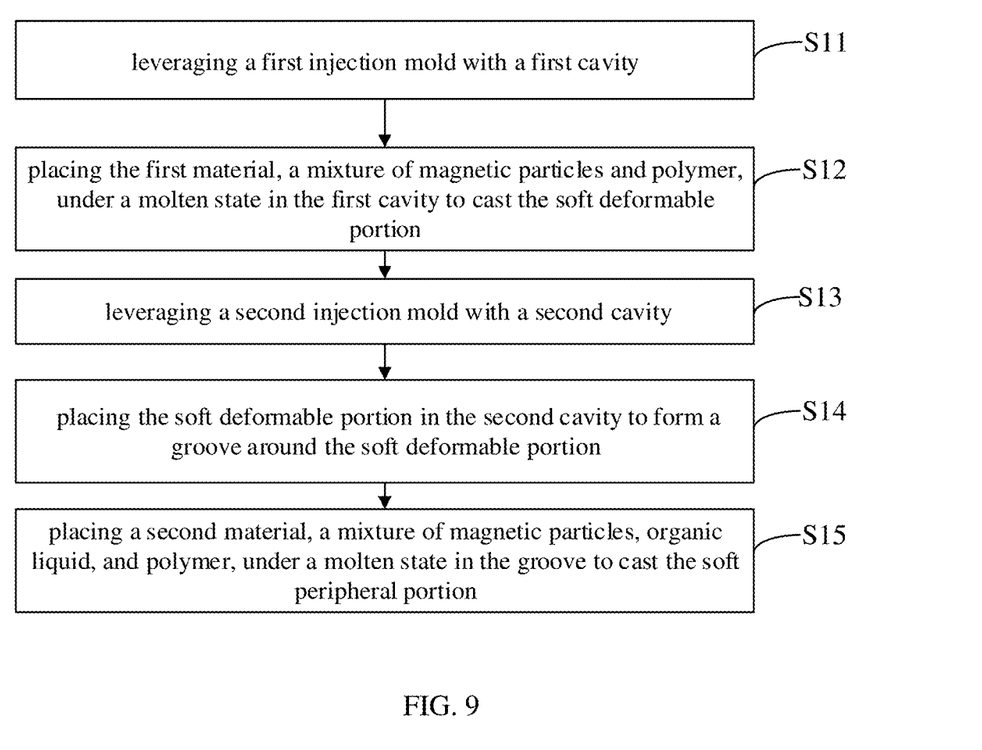
FIG. 9 is a flow chart of the method for fabricating a soft bistable magnetic actuator according to another embodiment of the present disclosure.

Specifically, as shown in FIG. 9, the operation S10 includes the following operations.

Operation S11, leveraging a first injection mold with a first cavity.

Operation S12, placing the first material, a mixture of magnetic particles and polymer, under a molten state in the first cavity to cast the soft deformable portion 11.

The present disclosure does not limit the type of magnetic particle and the polymer. The magnetic particle includes at least one of rubidium iron boron magnetic powder, alnico magnetic powder, hard ferrite magnetic powder, samarium cobalt magnetic powder, and other magnetic powders. In this embodiment, the magnetic particle is rubidium iron boron micron magnetic powder, and the polymer is one of the polymers. The polymer includes at least one of siloxane, polysilsesquioxane, polycarbosiloxane, polysilyl carbodiimide, polysilsesquioxane, polysilazane, and polysilsesquiazane. In this embodiment, the polymer is polydimethylsiloxane.

Operation S13, leveraging a second injection mold with a second cavity.

Operation S14, placing the soft deformable portion in the second cavity to form a groove around the soft deformable portion.

Operation S15, placing a second material, a mixture of magnetic particles, organic liquid, and polymer, under a molten state in the groove to cast the soft peripheral portion 12.

In the other embodiment, the operation S10 includes:
leveraging an annular mold, the annular mold contains a bottom, an inner wall, and an outer wall. An inner silicone sheet located in the center performs as the inner wall. A silicone sheet with a hole around the inner silicon sheet performs as the outer wall;
placing the second material under a molten state in the annular groove between the inner wall and the outer wall of the annular mold to cast the soft peripheral portion 12. The second material is the mixture of magnetic particles organic liquid, and polymer.
peeling off the inner silicon sheet to remove the inner wall of the annular mold and pour the first material under a molten state into the inner groove around the soft peripheral portion 12 to cast the soft deformable portion 11. The first material is a mixture of magnetic particles and polymer.

The present disclosure does not limit the type of the organic liquid, as long as it is compatible with the polymer and can be extracted by the organic solution. In this embodiment, the organic liquid is silicone oil.

Specifically, in this embodiment, to fabricate the soft precursor 1, the first injection mold and the second injection mold are provided. The first cavity is in the first injection mold, and the second cavity is in the second injection mold. The first material in a molten state is poured into the first cavity for injection molding to cast the soft deformable portion 11, the first material includes magnetic particles and polymer. After curing, the soft deformable portion 11 is then placed in the second cavity to form an annular groove around the soft deformable portion 11 in the second cavity. The second material in a molten state is poured into the annular groove for injection molding the soft peripheral portion 12. The second material includes magnetic particles, a mixture of organic liquid and polymer. In this way, the fabrication method is simple, and the sizes of the soft deformable portion 11 and the soft peripheral portion 12 can be adjusted manually, reducing the difficulty of adjusting the size caused by integral molding, thus saving manufacturing costs.

To transfer the configuration of the soft precursor 1 between two stable states quickly, the first cavity and the second cavity are both set as circular grooves, including a first circular groove and a second circular groove. The depth of the first cavity equals that of the second cavity. In addition, to adjust the deflection of the soft bistable magnetic actuator 100, the operation S13 includes:

selecting the first injection mold with the first cavity having different depths to control the buckling defection of the soft deformable portion 11.

In this embodiment, the first cavity and the second cavity are both set as circular grooves, including the first circular groove and the second circular groove. The depth of the first cavity equals that of the second cavity. The diameter of the second circular groove can be set as a preset value, the preset value herein is determined according to the user's needs. When the user reduces the thickness of the soft precursor 1 by reducing the depths of the first circular groove and the second circular groove, but keeps the size of the soft precursor unchanged, as a result, the deflection of the soft precursor 1 increases. When the thickness of the soft precursor 1 decreases to a certain value which depends on the material property, the deflection of the soft precursor 1 decreases as the thickness of the soft precursor 1 further reduces. Similarly, the depths of the first circular groove and the second circular groove can be increased so that the deflection soft precursor 1 can be reduced. It is easy to fabricate with the guidance of the principle, and the regulation improves the versatility of the soft actuator.

adjusting the deflection of the soft deformable portion 11, the user can determine the diameter of the first cavity in the first injection mold, and the diameter of the second cavity in the second injection mold.

The diameter of the second circular groove can be set as a preset value, the preset value herein is determined according to the user's needs. When the user increases the width of the first circular groove by increasing the radius of the soft deformable portion 11, but keeps the diameter of the second circular groove unchanged, as a result, the deflection of the soft precursor 1 increases. It should be noted that when the radius of the soft deformable portion 11 increases to a certain value which depends on the material property, the deflection of the soft precursor 1 decreases as the radius of the soft precursor 1 further increases. Similarly, the groove width of the first circular groove can be reduced by reducing the radius of the soft deformable portion 11, as a result, the deflection of the soft precursor 1 decreases. It is easy to fabricate with the guidance of the principle, and the regulation improves the versatility of the soft actuator.

Figure 10:
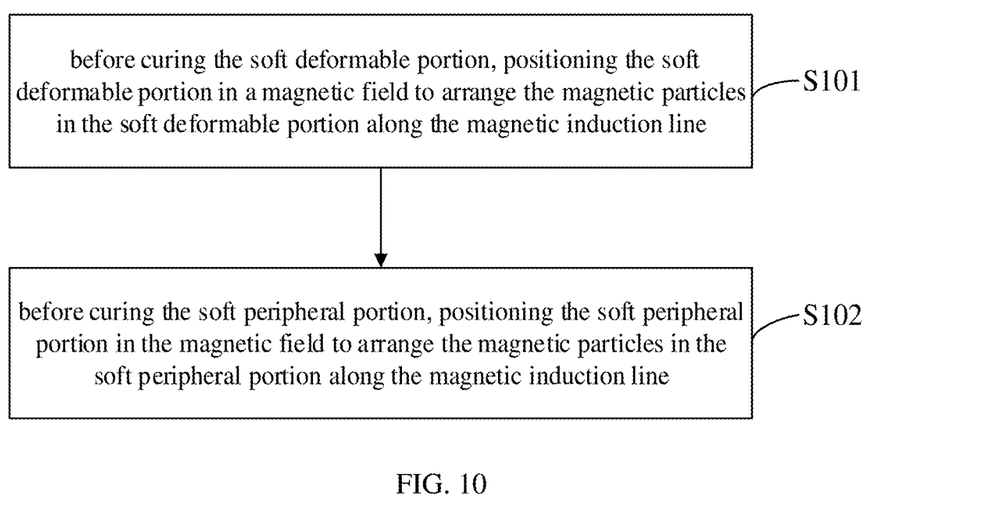
FIG. 10 is a flow chart of the method for fabricating a soft bistable magnetic actuator according to still another embodiment of the present disclosure.

As shown in FIG. 10, to transfer the configuration of the soft precursor 1 between two stable states with the magnetic field, the operation S10 includes the following operations.

Operation S101, before curing the soft deformable portion 11, positioning the soft deformable portion 11 in a magnetic field to arrange the magnetic particles in the soft deformable portion 11 along the magnetic induction line.

In this embodiment, the first material poured into the first cavity forms the soft deformable portion 11. The first material includes the magnetic particles and the polymer. The magnetic material and the polymer are well-mixed. The injection mold is in a magnetic field. The magnetic field is applied to the first material in the first cavity so that the magnetic particle in the first material can be distributed along the magnetic induction line. Then the first material is cured to form the soft deformable portion 11.

Operation S102, before curing the soft peripheral portion 12, positioning the soft peripheral portion 12 in the magnetic field to arrange the magnetic particles in the soft peripheral portion 12 along the magnetic induction line.

In this embodiment, the soft deformable portion 11 is placed in the second cavity so that an annular groove around the soft deformable portion 11 forms in the second cavity. The second material poured into the annular groove forms the soft peripheral portion 12. The second material includes the magnetic particles, the mixture of an organic liquid and a polymer. The injection mold is in a magnetic field. The magnetic field is applied to the second material in the annular groove so that the magnetic particles in the second material can be distributed along the magnetic induction line. Then the second material is cured to form the soft deformable portion 12.

The magnetic particles in the soft deformable portion 11 and the soft peripheral portion 12 are along the same direction through the fabrication method described above. The soft precursor 1 can be transferred from one stable state to the other stable state when switching the direction of the applied magnetic field. This fabrication method is easy, low-cost, and responsive.

The above are only some embodiments of the present disclosure and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A method for fabricating a soft bistable magnetic actuator, comprising the following operations:
    casting a soft precursor by injection molding, wherein the soft precursor consists of a soft deformable portion and a soft peripheral portion surrounded, the soft deformable portion is made of magnetic particles and polymer, and the soft peripheral portion is made of magnetic particles, a mixture of organic liquid and polymer; and
    extracting the organic liquid by an organic solvent to shrink the soft peripheral portion, to buckle the soft deformable portion.

2. The method of claim 1, wherein the operation of casting a soft precursor by injection molding comprises:
    leveraging a first injection mold with a first cavity;
    placing the first material, a mixture of magnetic particles and polymer, under a molten state in the first cavity to cast the soft deformable portion;
    leveraging a second injection mold with a second cavity;
    placing the soft deformable portion in the second cavity to form a groove around the soft deformable portion; and
    placing the second material, a mixture of magnetic particles, organic liquid, and polymer, under a molten state in the groove to cast the soft peripheral portion.

3. The method of claim 2, wherein both the first cavity and the second cavity are set as circular grooves, and the depth of the first cavity equals that of the second cavity;
    the operation of leveraging the first injection mold with the first cavity comprises:
    selecting the first injection mold with different cavity depths to control the buckling deflection of the soft deformable portion;
    the operation of leveraging the second injection mold with the second cavity comprises:
    selecting the first injection mold with different cavity diameters and the second injection mold with different cavity diameters to control the buckling deflection of the soft deformable portion.

4. The method of claim 1, wherein the operation of casting a soft precursor by injection molding comprises:
- before curing the soft deformable portion, positioning the soft deformable portion in a magnetic field to arrange the magnetic particles in the soft deformable portion along a magnetic induction line; and
- before curing the soft peripheral portion, positioning the soft peripheral portion in the magnetic field to arrange the magnetic particles in the soft peripheral portion along the magnetic induction line.

5. The method of claim 1, wherein the magnetic particle comprises at least one of rubidium iron boron magnetic powder, alnico magnetic powder, hard ferrite magnetic powder, and samarium cobalt magnetic powder; and/or
- the polymer comprises at least one of siloxane, polysilsesquioxane, polycarbosiloxaneur, polysilyl carbodiimide, polysilsesquioxane, polysilazane, and polysilsesquiazane; and/or
- the organic liquid comprises silicone oil.

* * * * *